(No Model.)  7 Sheets—Sheet 1.

D. G. BAKER.
COP WINDING MACHINE.

No. 599,488.  Patented Feb. 22, 1898.

Witnesses.—
John N. Tilly
M. E. Fletcher

Inventor.
Dickerson G. Baker
by attorneys
Brown & Seward (No Model.) 7 Sheets—Sheet 2.

D. G. BAKER.
COP WINDING MACHINE.

No. 599,488. Patented Feb. 22, 1898.

Witnesses
John N. Tilly
M. E. Fletcher

Inventor.
Dickerson G. Baker
by attorneys
Brown & Seward

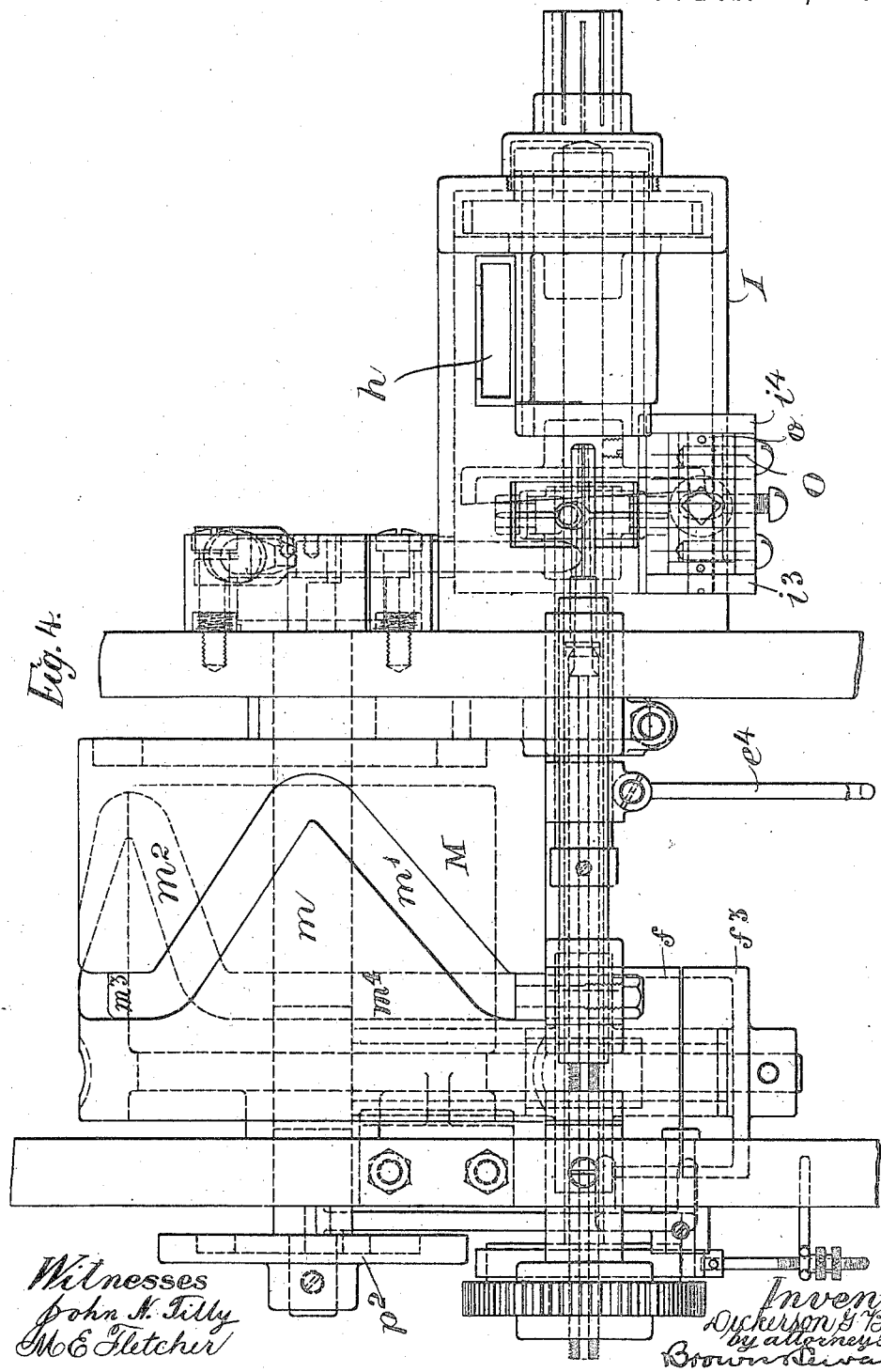

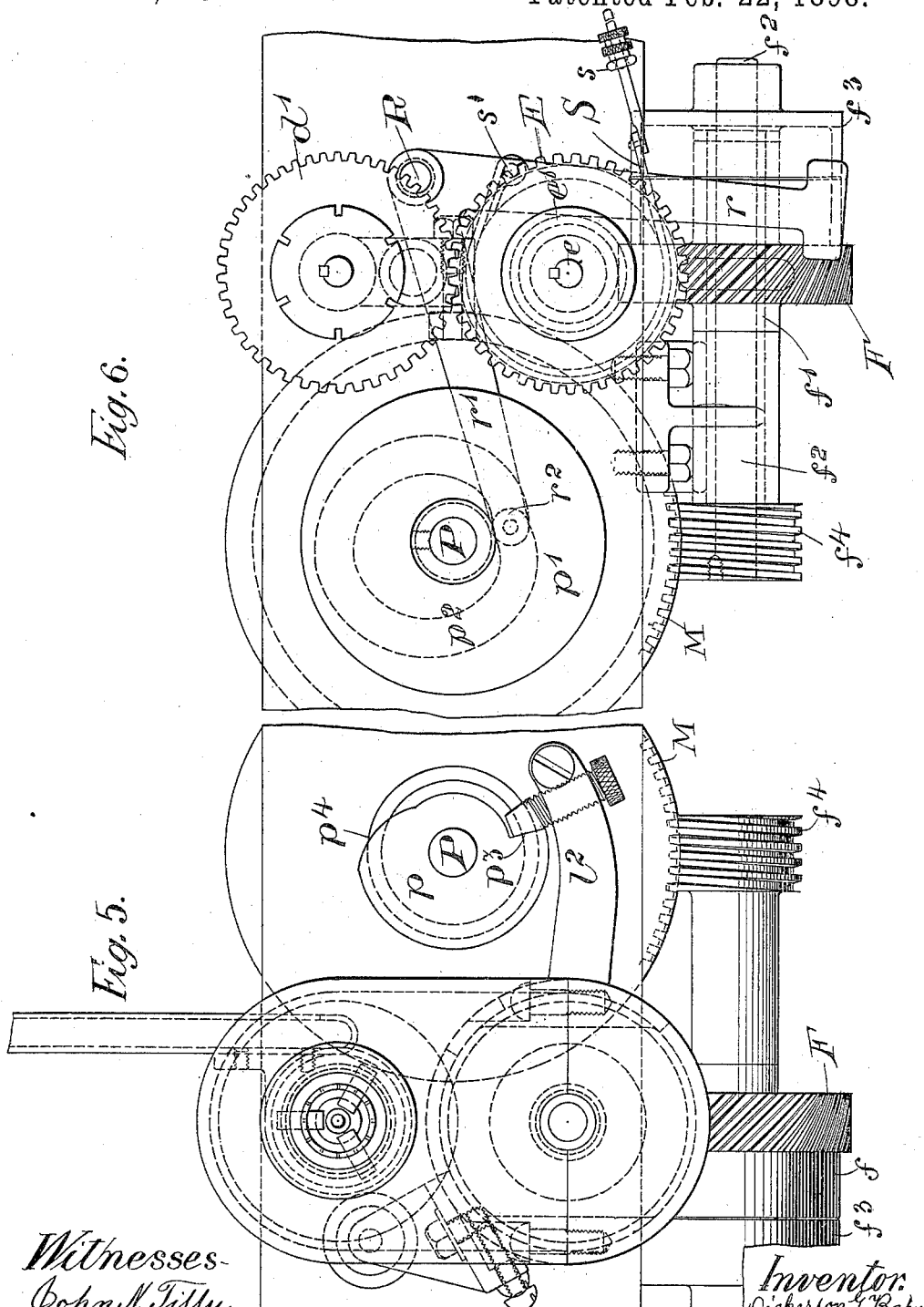

(No Model.) 7 Sheets—Sheet 5.
D. G. BAKER.
COP WINDING MACHINE.
No. 599,488. Patented Feb. 22, 1898.
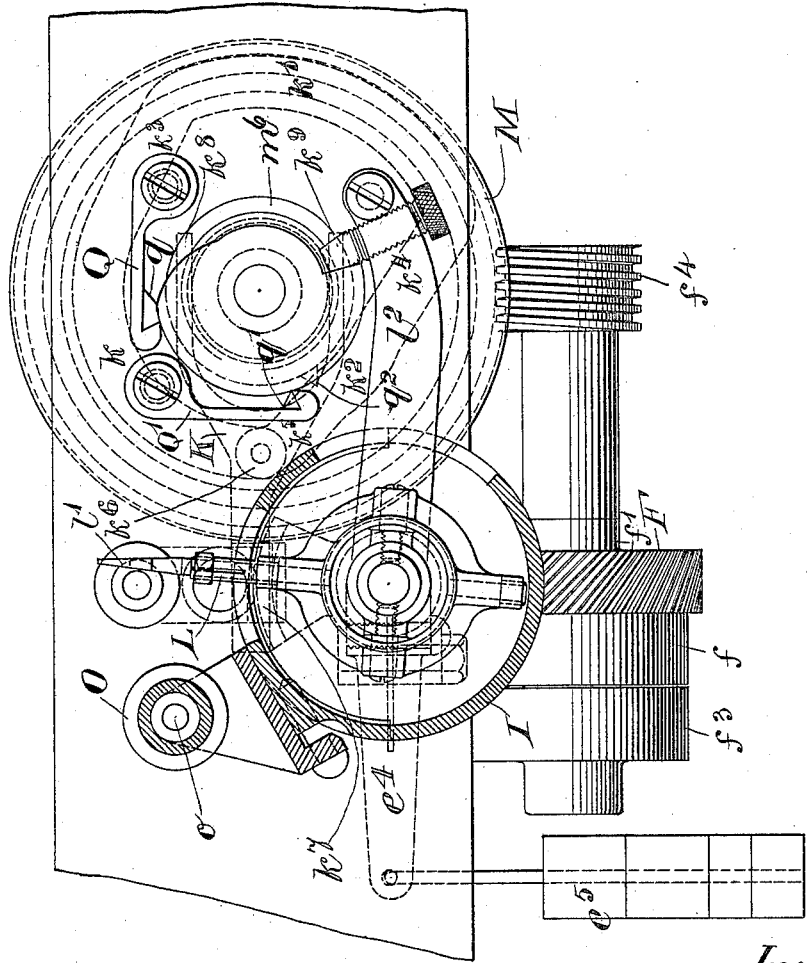
Witnesses
John H. Tilly
M. E. Fletcher
Inventor
Dickerson G. Baker
by attorneys
Brown Seward

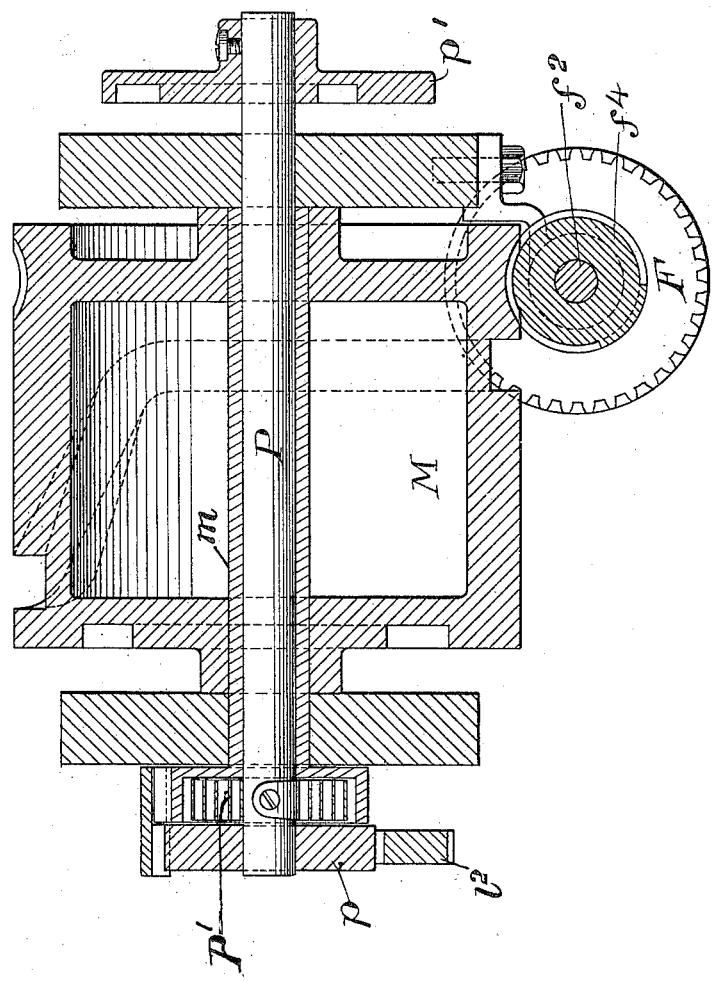

(No Model.) 7 Sheets—Sheet 7.

D. G. BAKER.
COP WINDING MACHINE.

No. 599,488. Patented Feb. 22, 1898.

Witnesses:—
M. E. Fletcher
George Barry Jr.

Inventor
Dickerson G. Baker
by attorneys
Brown & Seward

UNITED STATES PATENT OFFICE.

DICKERSON G. BAKER, OF WILLIMANTIC, CONNECTICUT.

COP-WINDING MACHINE.

SPECIFICATION forming part of Letters Patent No. 599,488, dated February 22, 1898.

Application filed December 11, 1896. Serial No. 615,306. (No model.)

*To all whom it may concern:*

Be it known that I, DICKERSON G. BAKER, of Willimantic, in the county of Windham and State of Connecticut, have invented a new and useful Improvement in Cop-Winding Machines, of which the following is a specification.

My invention relates to an improvement in machines for automatically winding successive cops or sets of cops upon cores and for automatically discharging the wound cops.

Figure 2:
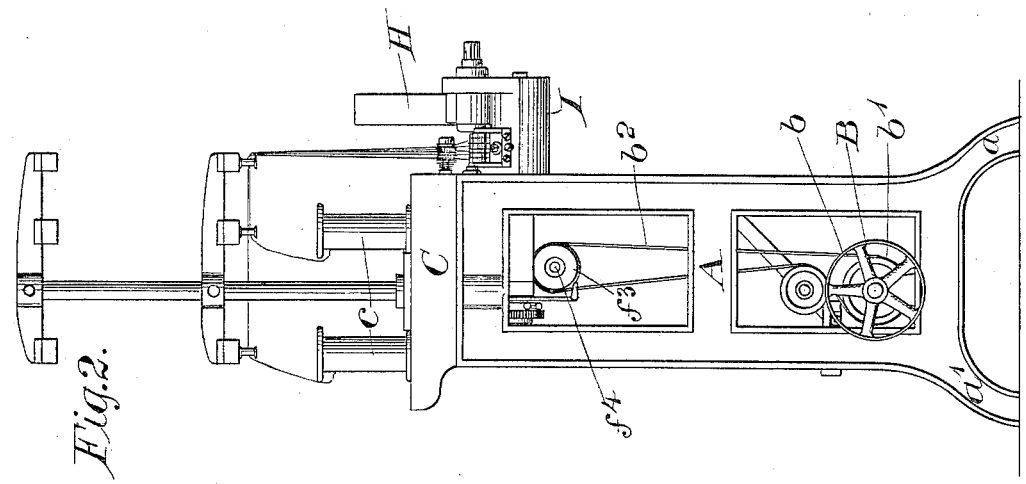
Figure 1:
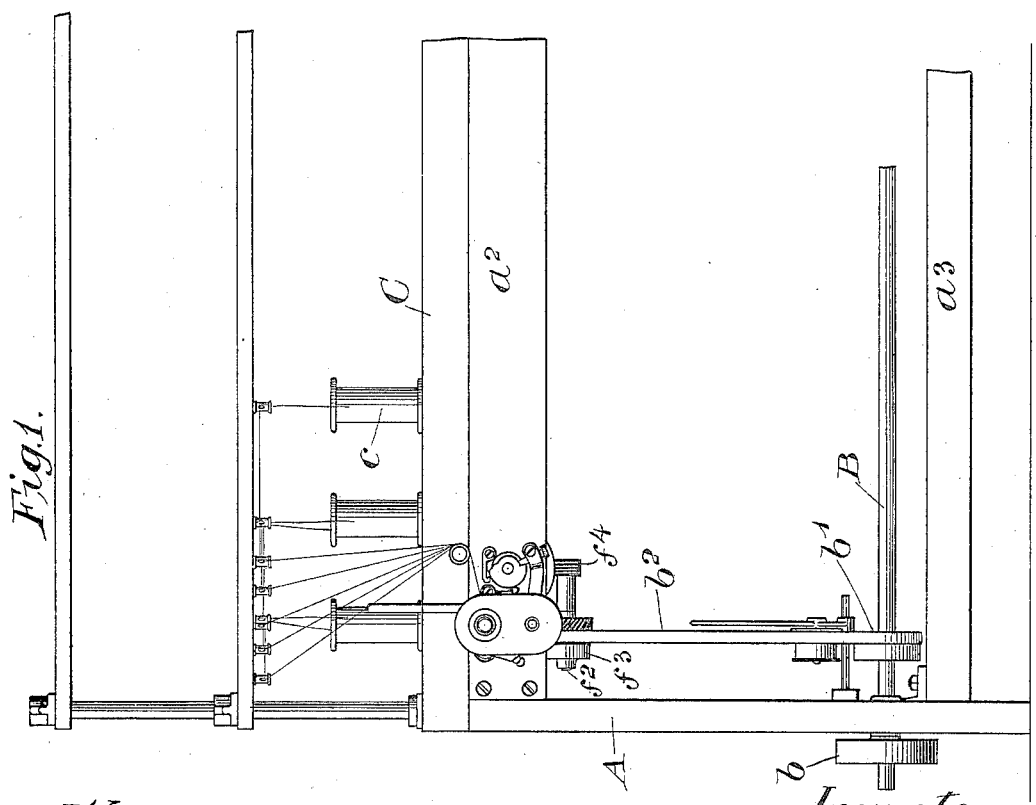
Figure 3:
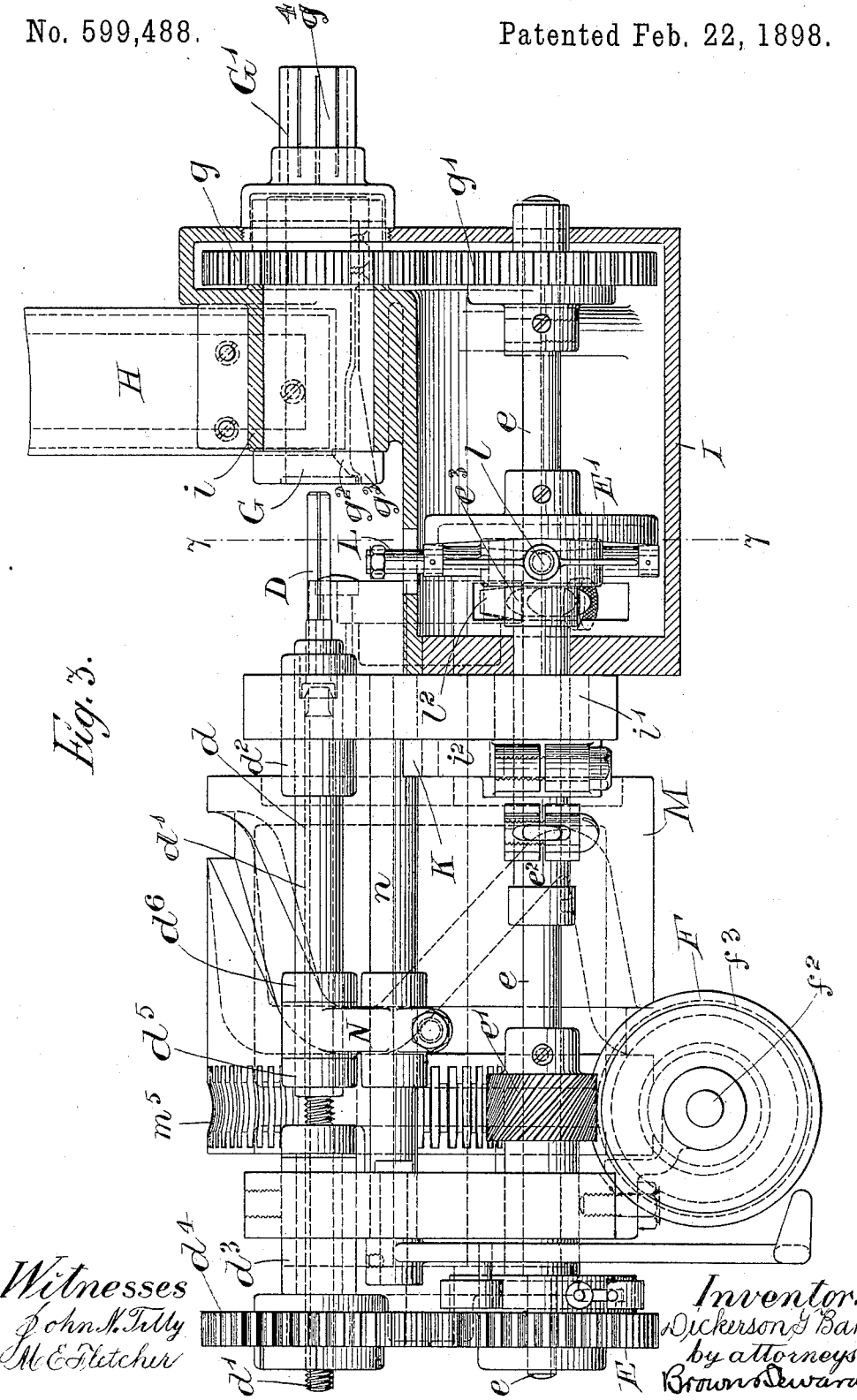
Figure 11:
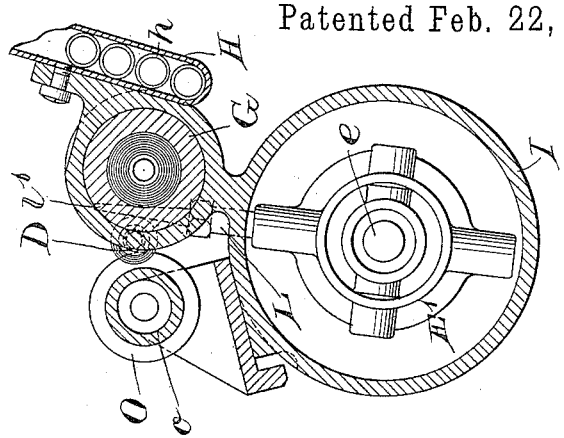
Figure 10:
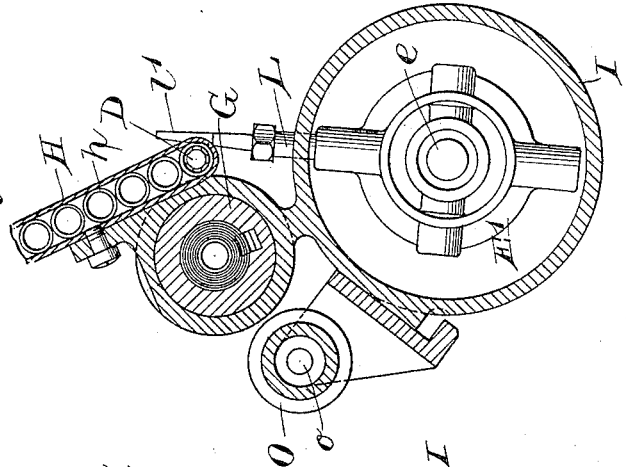
Figure 9:
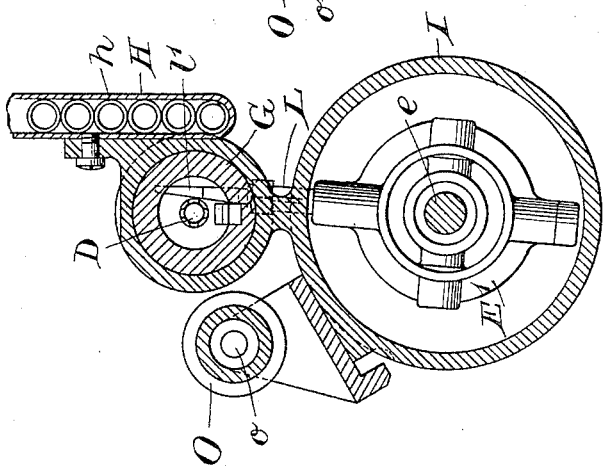

In the accompanying drawings, Figure 1 is a view of the machine in front elevation, showing one set of cop winding and discharging mechanisms in position, it being understood that in practice several such sets may be arranged side by side, mounted in the same general frame, and driven by a common driving-shaft. Fig. 2 is a view in end elevation. Fig. 3 is an enlarged view, partly in end elevation and partly in section, of the operative parts, exclusive of the drive-shaft. Fig. 4 is a top plan view of the same. Fig. 5 is a partial front view of the same. Fig. 6 is a partial rear view of the same. Fig. 7 is a vertical section taken in the plane of line 7 7 of Fig. 3, showing a part of the operating mechanism in front elevation and a part in section. Fig. 8 is a transverse section through the master cam-cylinder, showing the connection of the actuating-spring with the cylinder and the shaft on which the cylinder is mounted; and Figs. 9, 10, and 11 show in detail the several positions which the cop-receiver and core-reservoir assume with respect to the winding-spindle.

My invention, in the particular form in which I have at present embodied it, contemplates means for presenting hollow cores, one after another, at intervals in a position in alinement with the winding-spindle; means for advancing the winding-spindle to engage the core; means for imparting a retrograde movement to the spindle to carry the core thereon into position to receive the thread; means for rotating the spindle to wind several different cops of thread on the core; means for subdividing the core into parts corresponding to the number of cops being wound, and means for discharging the wound cops into a receiver, the several operations being automatically repeated as long as may be desired.

The supporting-frame of the machine conveniently consists of ends A, (one only being shown,) terminating in legs $a$ $a'$. The said ends A are connected by girders $a^2$ $a^3$, which may be made of such length as may be required to accommodate one or more of the winding and ejecting mechanisms, as may be desired. I prefer at present to mount four such mechanisms in a single frame.

A drive-shaft B, common to the several mechanisms, is mounted in suitable bearings in the ends A and carries a drive-pulley $b$, by which power is transmitted to the drive-shaft from a suitable source, (not shown,) and a pulley $b'$ for each winding and discharging mechanism for transmitting power from the shaft B through a belt $b^2$ to the drive-pulleys which actuate the winding and discharging mechanisms.

The supporting-frame A $a$ $a'$ $a^2$ $a^3$ is surmounted by a frame C for supporting a number of thread-supply spools $c$ in position to deliver the desired number of threads to the guide and thence to the spindle, according to the number of cops to be simultaneously wound.

The winding-spindle is denoted by D. It is secured in a holder $d$, which embraces and has a longitudinally-sliding movement on the spindle-shaft $d'$, the connection between the two being the ordinary spline-and-groove connection, by which the spindle-holder is caused to rotate with the spindle-shaft whatever be the longitudinal adjustment of the holder. The spindle shaft and holder are mounted in stationary bearings $d^2$ $d^3$, and on the shaft $d'$ there is fixed a gear-wheel $d^4$, which intermeshes with a like gear-wheel E, fixed on a shaft $e$, parallel with the shaft $d'$, and extending from the front of the main frame to form a support for the cop-receiver and core-reservoir. The shaft $e$ has fixed thereon a worm-wheel $e'$, which intermeshes with a worm-wheel F, fixed to rotate with a drive-pulley $f$, loosely mounted on a sleeve $f'$, (see Fig. 6,) which sleeve has mounted therein a shaft $f^2$, carrying a drive-pulley $f^3$, located adjacent to the drive-pulley F, and a worm $f^4$ for actuating the master cam-cylinder, to be hereinafter particularly explained.

The cop-receiver, comprising a rotary tubular section G and a non-rotary tubular section G', and the core-reservoir H, located a short distance from and at the side of the tubular section G, are supported upon a tubular base or housing I, the ends of which are mounted in rocking adjustment on the forwardly-projecting end of the shaft $e$. The rotary section G of the cop-receiver is mounted in a cylindrical bearing $i$ in position to be swung in front of the winding-spindle D, with its axis of rotation in alinement with the axis of the spindle, and the bottom of the core-reservoir is also so located as to bring a core $k$, resting therein, into axial alinement with the winding-spindle as the support I is rocked on the shaft $e$. The rotary section G is in alinement with the non-rotary section G' of the receiver and is provided with a gear-wheel $g$, fixed to rotate therewith, which gear-wheel intermeshes with a gear-wheel $g'$, fixed on the shaft $e$. The gears $g$ $g'$ correspond to the gears $d^4$ E, so that the rotary receiver-section G and the spindle will rotate at the same speed. The interior of the section G is provided with spring retaining-hooks $g^2$—in the present instance three in number and located at equal distances apart around the receiver—so seated in recesses $g^3$ in the interior wall of the receiver that they may be readily forced outwardly as the wound cops are passed into the receiver to permit the cops to pass freely, but adapted to spring inwardly after the cops have passed their hook ends to prevent the withdrawal of the cops. The section G' of the receiver is somewhat choked by spring-tongues $g^4$, which project slightly from the inner wall of the receiver to hold the cops, which may have been forced therein from the rotary section G, in position until they are forced from the receiver by the thrust of a succeeding set.

The rocking support I has a hub extension $i'$ through the front of the supporting-frame and has clamped to it an arm $i^2$, which may be a sector-arm, by which the support I and parts carried thereby are rocked bodily on the shaft $e$ through a connecting rod or bar K, controlled by the master cam-cylinder, as will be hereinafter more particularly described.

On the shaft $e$ there is a sleeve $e^2$, which extends from a point within the housing I through the hub $i'$. The sleeve $e^2$ has mounted thereon within the housing I the thread-guide arm L, the connection of the guide-arm with the sleeve being made by trunnions $l$, projecting radially from the opposite sides of the sleeve to permit the arm to be vibrated in the plane of the axis of the sleeve, while at the same time subject to rock with the sleeve.

The thread-guide proper is denoted by $l'$, (see Fig. 7,) and may be of any well-known or approved form adapted to distribute the several threads to positions on the winding-spindle to form the several cops to be wound and subject to the gradually-increasing size of the cop to be pushed away from the spindle and through its swinging movement to rock the sleeve $e^2$ and a trip-dog $l^2$, carried by the sleeve, to stop the winding-spindle when the cop has reached a predetermined size, as will hereinafter more particularly appear.

The sleeve $e^2$ has the trip-dog $l^2$ fixed to it at $e^3$ within the housing I, and it also has fixed thereto exterior to the housing I an arm $e^4$ for sustaining a weight $e^5$ to counterbalance the dog $l^2$ and give the thread-guide the desired pressure against the periphery of the cop being wound.

The shaft $e$ has fixed to rotate therewith a disk E', the inclined face of which bears against the guide-arm support and serves as the shaft $e$ rotates to impart a vibratory movement to the thread-guide in a direction transverse to that in which the thread is fed to lay the thread obliquely on the periphery of the cop being wound.

The part which I have chosen to designate as the "master cam-cylinder" is denoted by M. It is mounted to rotate on a sleeve $m$, supported parallel with the spindle-shaft, and has formed in its exterior curved surface a cam-groove consisting of two V-shaped portions $m'$ $m^2$, separated by a shorter annular portion $m^3$ and a longer annular portion $m^4$. An arm N, mounted on a guide rod or bar $n$ to slide freely along its support parallel with the spindle-shaft, projects into the cam-groove $m'$ $m^2$ $m^3$ $m^4$ and is controlled in its sliding movement by said cam-groove as the cylinder M is rotated. The arm N also embraces the winding-spindle holder $d$ between two abutments $d^5$ and $d^6$ thereon, as shown at $n'$, Fig. 3, so that the movement of the arm N under the control of the cam-groove in the cylinder will move the spindle-holder, and hence the spindle D, longitudinally forward and backward as the arm travels along the V-shaped portions of the cam-groove.

The cam-cylinder M is further provided with a cam-groove in its front end for operating the bar K, hereinabove referred to, to rock the cop-receiver and core-reservoir back and forth to present the receiver and a core alternately in front of the winding-spindle. The said cam-groove consists of three annular portions, denoted, respectively, by $k$ $k'$ $k^2$, and intermediate straight portions, denoted by $k^3$ $k^4$ $k^5$. (See Fig. 7.) This cam-groove receives a laterally-projecting roller $k^6$ on the bar K, and as the said roller travels along the groove during the rotary movement of the cylinder imparts to the bar K, and hence to the section-arm $i^2$, with which the bar K engages by means of rack-teeth $k^7$ on its under side, a positively-reciprocating movement to present a core to the spindle and a secondary reciprocating movement to bring the cutters out of and into engagement with the core to subdivide it. The operating-bar K has one end bifurcated, the branches $k^8 k^9$ embracing the opposite sides of a hub at the end of the cylinder M to serve as a guide for the bar.

The core-cutters hereinabove referred to consist of a series of sharp disks O, fixed at suitable distance apart on a rotary spindle $o$, supported in standards $i^3 i^4$, fixed to the support I. The distance between two successive cutters O is made slightly greater than the thickness of a cop for the purpose of severing a core $b$ into parts having lengths as nearly as may be equal to the thickness of a cop.

The master cam-cylinder M is positively rotated when the belt $b^2$ is shifted onto the pulley $f^3$ by means of the worm $f^4$ on the shaft $f^2$, which worm engages an annular series of worm-teeth $m^5$ on the periphery of the cylinder M.

The shifting of the belt $b^2$ from the pulley $f$, which drives the winding-spindle, onto the pulley $f^3$, then onto both pulleys $f$ and $f^3$, and finally back again onto the pulley $f$ to effect the several operations of discharging the wound cops, receiving a new core, starting the winding, and subdividing the core is accomplished as follows: Through the sleeve $m$, on which the master cam-cylinder is mounted, there extends a shaft P, which has fixed to its front end a cam wheel or disk $p$ and to its rear end a disk $p'$, provided with a cam-groove $p^2$. The cam-disk $p$ has a portion of its periphery cut away, forming an abrupt abutment $p^3$ for engaging the nose of the trip-dog $l^2$ and a gradual incline $p^4$ for permitting the nose of the trip-dog to gradually assume a position to engage the abutment $p^3$. The abutment $p^3$ during its rotary movement, when released from the trip-dog $l^2$, is caught and the rotary movement of the shaft P and disks thereon interrupted at intervals by retaining-pawls Q and Q', actuated in any well-known or approved manner. The pawls Q and Q' are pivoted to the supporting-frame and have a beveled lifting-surface $q q'$, offset laterally from the hook portion to clear the abutment $p^3$, but in position to engage a releasing-tappet $q^2$, fixed on the periphery of a hub $m^6$, projecting forwardly from the end of the master cam-cylinder M. The shaft P is actuated by a coiled spring P', one end of which is fixed to the shaft and the opposite end to the interior of the hub $m^6$ in such a manner that its tension will tend to rotate the shaft P in a direction the reverse of that in which the hands of a watch move as looked at from the front, and the rotary movement of the cam-cylinder about the shaft P will serve to wind the spring P' after the rotary movement of the shaft P has expended its force or part of its force, keeping it at all times under effective tension to rotate the shaft. As the shaft P is permitted to rotate by the release of the trip-dog and retaining-pawls, it operates the belt-shifter through the medium of the cam-groove $p^2$ in the disk $p'$ as follows: The belt-shifter consists of a bell-crank lever pivoted to the frame at R, its arm $r$ extending into position to embrace the opposite edges of the belt $b^2$ and its arm $r'$ being provided with a laterally-projecting roller $r^2$ in position to follow the cam-groove $p^2$. A brake S, consisting of a flexible strap, has one end attached to the frame at $s$, and after passing around a brake-wheel on the shaft $e$ has its opposite end attached at $s'$ to the arm $r$ of the belt-shifting lever, so that when the arm $r$ is moved to shift the belt from the pulley $f$ onto the pulley $f^3$ the strap S will be drawn into close contact with the brake-wheel on the shaft $e$ and cause the said shaft and hence the winding-spindle to promptly stop its rotary movement. When the cops being wound have reached a predetermined size and have rocked the sleeve $e^2$ and the trip-dog carried thereby sufficiently to release the nose of the dog from the abutment $p^3$, the shaft P will rotate quickly under the tension of its operating-spring until its rotary movement is arrested by the engagement of the abutment $p^3$ with the retaining-pawl Q. This partial rotation (in this case a half-revolution) of the shaft P, carrying with it the grooved cam-disk $p'$, will rock the belt-shifter its full throw, shifting the belt $b^2$ from the spindle-driving pulley $f$ onto the driving-pulley $f^3$ and through the action of the brake S promptly stopping the rotary movement of the winding-spindle and also of the rotary section of the cop-receiver. The master cam-cylinder will then begin to rotate in the same direction as the shaft P was rotated by the shaft $f^2$ and worm $f^4$ and will continue its rotary movement until the belt has been entirely removed from the drive-pulley $f^3$. The belt will remain wholly on the drive-pulley $f^3$ and the winding-spindle be prevented from a rotary movement while the cylinder M is completing three-fourths of a rotation, more or less—that is, while the releasing-tappet $q^2$ is being carried from its position shown in Fig. 7 to a position to lift the retaining-pawl Q and again release the shaft P. During this two-thirds rotation of the cylinder M, more or less, the two V-shaped portions $m' m^2$ and the intermediate annular portion $m^3$ of the cam-groove in the curved face of the cylinder will have operated upon the spindle-holder $d$, with the following results: The spindle, with the wound cops thereon, will have been thrust into the rotary section G of the cop-receiver and withdrawn from the same, leaving the cops therein. This will have been accomplished by the V-shaped portion $m'$ of the cam-groove. While this has been taking place the roller $k^6$ on the operating-bar K has been traveling along the circular portion $k$ of the cam-groove in the front end of the cylinder M and has not disturbed the position of the cop-receiver relatively to the winding-spindle. At this point, however, and while the spindle-holder $d$, and hence the spindle, are held in the normal position by the engagement of the annular portion $m^3$ of the cam-groove with the arm on the spindle-holder, the bar K is forced to the left by the straight or tangential portion $k^3$ of the groove in the end of the cylinder, and the support I, and hence the cop-receiver and core-reservoir, are rocked to the left, bringing the core at the bottom of the reservoir into alinement with the spindle. The core-reservoir is held in this position by the engagement of the circular portion $k'$ of the cam-groove with the roller $k^6$, while the V-shaped portion $m^2$ of the cam-groove in the curved surface of the cylinder imparts to the spindle a second forward-and-return movement—a forward movement to enter a core and a return movement with the core thereon. At this moment the retaining-pawl Q is released by the tappet $q^2$ and the shaft P turns around until it is stopped by the engagement of the second retaining-pawl $Q'$ with the abutment $p^3$. This partial rotation of the shaft P, through the medium of the cam-groove in the disk $p'$, will operate the belt-shifter to shift the belt into position partly on each of the drive-pulleys $f$ and $f^3$, and will thereby start the rotation of the winding-spindle, while the rotation of the master cam-cylinder will be continued. The portion $m^4$ of the cam-groove in the curved surface of the cylinder being annular, the position of the spindle will not be further affected. The straight portion $k^4$ of the cam-groove in the end of the cylinder will, through the operating-bar K, rock the support I over toward the right while the winding of a new set of cops is being started, the threads from the previously-wound set leading from within the rotary section G of the receiver out around the core on which the new set is being wound and the said previously-wound cops being rotated in the section G at the same rate at which the winding-spindle is rotated. The rocking movement of the support I will be continued by the portion $k^4$ of the cam-groove until it has brought the cutters O into engagement with the core $h$ to sever it and the threads between the cops, and the short circular portion $k^2$ of the groove serves to hold the cutters there a little time, when the following straight portion $k^5$ of the groove serves to rock the support I a short distance back to the left to move the cutters out of engagement with the cores and bring the section G of the receiver in alinement with the spindle ready to receive the wound cops. At this moment the tappet $q^2$ releases the second retaining-pawl $Q'$ and the shaft P completes its rotation, being stopped by the nose of the trip-dog $l^2$. This movement of the shaft P operates the belt-shifter, throwing it wholly onto the pulley $f$, and the operation of winding and discharging the cops is ready to be repeated in the manner above described.

What I claim is—

1. In combination, a winding-spindle, means for rotating the spindle, means for advancing and retracting the spindle, a cop-receiver and core-reservoir and means for moving them into and out of alinement with the spindle, substantially as set forth.

2. In combination, a winding-spindle, means for rotating the spindle, a guide for directing a plurality of threads to the spindle, means for ejecting the cops from, and placing a core on the spindle, and means for subdividing the core into core-sections corresponding to the several cops, substantially as set forth.

3. In combination, a winding-spindle, means for rotating the spindle, means for advancing and retracting the spindle, a cop-receiver and core-reservoir mounted to move in unison and means for moving them into and out of alinement with the spindle, substantially as set forth.

4. In combination, a winding-spindle, means for rotating the spindle, a core-reservoir, means for moving the core-reservoir into and out of alinement with the spindle and means for transferring a core from the reservoir onto the winding-spindle, substantially as set forth.

5. In combination, a winding-spindle, means for rotating the spindle, a core-reservoir, means for moving the core-reservoir into and out of alinement with the spindle, means for transferring a core from the reservoir onto the spindle and means for subdividing the core while on the spindle, substantially as set forth.

6. In combination, a winding-spindle, means for rotating the spindle, a core-reservoir and set of core-cutters mounted to move in unison and means for moving the core-reservoir and set of cutters into and out of position to place a core on the spindle and sever the core on the spindle substantially as set forth.

7. In combination, a winding-spindle, means for rotating the spindle, a cop-receiver, a core-reservoir and set of core-cutters, the said receiver, reservoir and cutters being mounted to move in unison; and means for moving them to bring the receiver and the reservoir at intervals into alinement with the spindle, and the cutters into engagement with the core on the spindle, substantially as set forth.

8. In combination, a winding-spindle, means for rotating the spindle, means for discharging the cops, a core-supply and means for imparting a plurality of longitudinally-reciprocating movements to the winding-spindle intermediate of its successive rotary movements substantially as set forth.

9. In combination, a winding-spindle, means for discharging wound cops, means for placing a core on the spindle, means for subdividing the core, a pulley for imparting a rotary movement to the winding-spindle, a pulley for imparting motion to the cop-discharging mechanism, core-receiving mechanism, a drive-belt and means for automatically shifting the belt into positions to actuate first one pulley, then the other pulley and then both pulleys, substantially as set forth.

10. In combination, a winding-spindle, means for moving the spindle axially, means for rotating the spindle, a rotary cop-receiver, means for rotating the cop-receiver simultaneously with the winding-spindle, and means for automatically moving the cop-receiver laterally with respect to the winding-spindle, substantially as set forth.

11. In combination, a winding-spindle, means for rotating the spindle, a cam-cylinder, means under the control of the cop being wound for stopping the winding and starting rotation of the cam-cylinder, a cop-receiver and core-reservoir mounted to move transversely with respect to the winding-spindle and means under the control of the cam-cylinder for reciprocating the winding-spindle in a longitudinal direction and for reciprocating the receiver and reservoir transversely to the movement of the spindle, substantially as set forth.

12. In combination, drive-pulleys, a drive-belt, a belt-shifter, a winding-spindle controlled in its rotary movement by one pulley, a cop-discharging and core-manipulating means controlled by another pulley, a rotary shaft, means tending to rotate it, cams on the shaft, one for actuating the belt-shifter and another for determining the movement of the shaft, a trip-dog under the control of a cop being wound to engage the latter of said cams, retaining devices for interrupting the rotary movement of the shaft, and means for releasing the retaining devices at suitable intervals, substantially as set forth.

13. In combination, a winding-spindle, means for actuating it, a rotary cop-receiver, a core-reservoir and a shaft and gear for transmitting a rotary movement to the cop-receiver, the said cop-receiver and core-reservoir being mounted concentric with the said shaft to rock in a plane transverse to the axis of the winding-spindle, substantially as set forth.

14. In combination, a winding-spindle, means for rotating the spindle, a rotary cam arranged to reciprocate the spindle in a longitudinal direction, driving-pulleys, a belt-shifter, retaining devices for holding the belt-shifter in several different positions during the winding and discharging of a cop and a device operated by the said rotary cam for releasing the said retaining devices at the desired intervals, substantially as set forth.

DICKERSON G. BAKER.

Witnesses:
FREDK. HAYNES,
M. E. FLETCHER.